United States Patent
Du et al.

(10) Patent No.: US 12,425,743 B2
(45) Date of Patent: Sep. 23, 2025

(54) FOVEATED IMAGES WITH ADAPTIVE EXPOSURE

(71) Applicant: GOOGLE LLC, Mountain View, CA (US)

(72) Inventors: Ruofei Du, San Francisco, CA (US); Alex Olwal, Santa Cruz, CA (US)

(73) Assignee: GOOGLE LLC, Mountain View, CA (US)

( * ) Notice: Subject to any disclaimer, the term of this patent is extended or adjusted under 35 U.S.C. 154(b) by 208 days.

(21) Appl. No.: 18/316,710

(22) Filed: May 12, 2023

(65) Prior Publication Data

US 2024/0380981 A1    Nov. 14, 2024

(51) Int. Cl.

| | | |
|---|---|---|
| *H04N 23/73* | (2023.01) | |
| *G02B 27/01* | (2006.01) | |
| *G06F 3/01* | (2006.01) | |
| *G06T 1/20* | (2006.01) | |
| *G06T 5/20* | (2006.01) | |
| *G06V 10/25* | (2022.01) | |
| *G06V 10/60* | (2022.01) | |
| *H04N 23/698* | (2023.01) | |

(52) U.S. Cl.
CPC ......... *H04N 23/73* (2023.01); *G02B 27/0172* (2013.01); *G06F 3/013* (2013.01); *G06T 1/20* (2013.01); *G06T 5/20* (2013.01); *G06V 10/25* (2022.01); *G06V 10/60* (2022.01); *H04N 23/698* (2023.01); *G06T 2207/20208* (2013.01)

(58) Field of Classification Search
None
See application file for complete search history.

(56) References Cited

U.S. PATENT DOCUMENTS

| | | | |
|---|---|---|---|
| 10,572,764 B1 * | 2/2020 | Bastani | G06F 3/013 |
| 12,174,383 B2 * | 12/2024 | Palacios | G02F 1/133 |
| 2012/0134587 A1 | 5/2012 | Gobert | |
| 2017/0169602 A1 * | 6/2017 | Blackmon | G06T 15/06 |
| 2017/0287112 A1 * | 10/2017 | Stafford | G06F 3/013 |
| 2018/0084176 A1 | 3/2018 | Igor' Valer'Evich | |
| 2019/0094963 A1 * | 3/2019 | Nijs | G06F 3/039 |
| 2019/0138088 A1 * | 5/2019 | Evans | H04N 13/344 |

(Continued)

OTHER PUBLICATIONS

Di Donato, "Foveated Rendering", https://developer.arm.com > media > developer, Nov. 2017, 27 pages.

(Continued)

*Primary Examiner* — Cynthia Segura
(74) *Attorney, Agent, or Firm* — Brake Hughes Bellermann LLP (57) ABSTRACT

Systems and methods are disclosed that address the need for adaptive exposure within high dynamic range (HDR) images. Solutions can leverage recent advances in the use of virtual reality (VR) headsets and Augmented Reality (AR) displays equipped with infrared (IR) eye tracking devices. A gaze vector determined by the eye tracking device identifies one or more fixation points on the image that corresponds to an area where there exists a faulty exposure. The exposure around the fixation point can be adaptively corrected using image processing techniques. Using spatial adaptive exposure, the resulting image, a type of foveated image, can be rendered on a low dynamic range (LDR) display with sufficient detail.

21 Claims, 11 Drawing Sheets

(56) References Cited

U.S. PATENT DOCUMENTS

| | | | |
|---|---|---|---|
| 2019/0287495 A1* | 9/2019 | Mathur | G06F 3/011 |
| 2020/0051483 A1* | 2/2020 | Buckley | G09G 3/002 |
| 2020/0244883 A1* | 7/2020 | Baran | H04N 23/45 |
| 2021/0099632 A1* | 4/2021 | Molholm | G06T 15/503 |
| 2021/0329316 A1 | 10/2021 | Ninan | |
| 2022/0350151 A1 | 11/2022 | Breugelmans et al. | |
| 2023/0337911 A1* | 10/2023 | Ooi | A61B 5/163 |
| 2024/0212091 A1* | 6/2024 | Byun | G06T 5/50 |
| 2024/0380961 A1* | 11/2024 | Park | H04N 23/55 |

OTHER PUBLICATIONS

International Search Report and Written Opinion for PCT Application No. PCT/US2024/028946, mailed on Sep. 19, 2024, 16 pages.

\* cited by examiner

FOVEATED IMAGES WITH ADAPTIVE EXPOSURE

FIELD OF THE DISCLOSURE

The present disclosure relates to the display of images in the context of a virtual reality (VR) or augmented reality (AR) experience.

BACKGROUND

Wearable computing devices used to create an AR experience may include, for example, head-mounted wearable devices, wrist-worn wearable devices, hand-worn wearable devices, pendants, and the like. Head-mounted wearable devices for AR/VR may include, for example, car buds and head-mounted eyewear such as smart glasses, headsets, or goggles. Cameras can be disposed on the head-mounted eyewear, and images can be projected onto the lens of the head-mounted eyewear, providing a heads-up display (HUD). Cameras attached to a frame of the head-mounted eyewear can include a world-facing camera and an eye/gaze tracking device. Content displayed on the heads-up display can include images and information received from the world-facing camera, the Internet, or other sensory input. The eye/gaze tracking device can provide feedback to the AR/VR system for continuously adjusting the display, so the display is projected onto an area of the lens where the user is looking. Wrist/hand-worn accessories may include, for example, smart watches, smart bracelets, smart rings, and the like. Wearable computing devices may include various types of electronic components for computation and both long-range and short-range radio frequency (RF) wireless communication.

SUMMARY

The present disclosure describes methods and systems for applying spatially adaptive exposure to digital HDR images.

In some aspects, the techniques described herein relate to a method, including: identifying a digital image having an underexposed area or an overexposed area; tracking eye motion of an observer of the digital image to determine a fixation point; applying a Gaussian mask to the digital image around the fixation point; for each pixel within the Gaussian mask: computing a pixel intensity; increasing an exposure setting of the pixel in the digital image wherever the pixel intensity is darker than a dark threshold value; and decreasing the exposure setting of the pixel in the digital image wherever the pixel intensity is lighter than a light threshold value; and causing display of the digital image to a user.

In some aspects, the techniques described herein relate to a system, including: a display; a world-facing camera attached to the display, the world-facing camera configured to produce a digital image for projection onto the display; an gaze tracking device attached to the display, the gaze tracking device configured to identify selected pixels of the digital image; and a graphics processing unit (GPU), communicatively coupled to the world-facing camera, the gaze tracking device, and the display, the GPU configured to adaptively correct exposures of the selected pixels to produce a foveated image for projection onto the display.

In some aspects, the techniques described herein relate to a headset, including: a wearable display; a world-facing camera attached to the wearable display; a gaze tracking device attached to the wearable display; and a graphics processing unit (GPU) coupled to the world-facing camera, the gaze tracking device, and the wearable display, the GPU configured to: receive image data and an identified area of interest; adjust an exposure of a portion of the image data corresponding to the identified area of interest, to produce a foveated image; and project the foveated image onto the wearable display.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

Components in the drawings are not necessarily to scale relative to each other. Like reference numerals designate corresponding parts throughout the several views.

DETAILED DESCRIPTION

In the physical world, human beings perceive images with adaptive exposure. For example, the human eye adapts so as to be able to view stars in the night sky in the presence of a nearby light. Under photopic, or light adapted vision, both the rods and cones of the human eye are active with a sensitivity to light of about 680 lumens per Watt. Under scotopic, or dark adapted vision, only the rods of the human eye are active, resulting in a sensitivity to light of 1700 lumens per Watt. So, the human eye automatically adjusts to light levels by including or excluding the cones as sensors.

In the digital world, adjustments to light levels are not automatic, creating multiple issues. First, high dynamic range (HDR) images are stored as 10-bit, 12-bit, or even 16-bit blocks of data, while the images are rendered in low dynamic range (LDR) displays, in 3×8-bit channels. Thus, details of the image that have been captured are lost in the process of displaying the image to the user. Second, the brightness of pixels remains uniform when viewing different parts of the same HDR image. With 8-bit channels, a global value is used to change the brightness and contrast of the entire image, without adapting to spatial variations in brightness. Consequently, a technical problem that arises with HDR images is that portions of the images can be overexposed or underexposed, obscuring detail in those areas.

Systems and methods disclosed herein address the need for adaptive exposure within HDR images. Implementations can apply adaptive exposure within spherical panoramic images, referred to as 360-degree HDR" images, or "domes." Such images can be captured by 360 cameras or derived from synthetic 3D scenes. The solutions described herein leverage recent advances in the use of VR headsets and AR displays equipped with infrared (IR) gaze tracking devices. With the use of IR eye tracking, the direction of a user's eye gaze can be detected with a high degree of accuracy to identify a precise area of an image that captures the user's attention. IR eye tracking illuminates the pupil of the eye with infrared or near infrared light to generate a reflection from surfaces of the cornea that can be recorded by an optical sensor or an IR camera, e.g., a gaze tracking device located on the frame of VR/AR glasses. By processing changes in the reflection data at time intervals of, for example, $1/120^{th}$ of a second (corresponding to 12 Hz), eye rotation can be determined and, in turn, the user's gaze direction, or gaze vector.

The gaze vector identifies one or more fixation points on the image that corresponds to an area of interest. The area of interest can be an area having a faulty exposure. Faulty exposure refers to an area of an image that is too bright (overexposed) or too dark (underexposed), thus obscuring image data. Once a fixation point is determined, the exposure around the fixation point can be adaptively corrected using image processing techniques. The resulting image is a type of foveated image, in which areas of the image that align with the fovea, or the center of the user's retina, are rendered with greater detail, e.g., by changing the exposure settings of pixels in the area of interest, than other areas. Consequently, image enhancement using adaptive exposure using the techniques disclosed herein can augment human vision to facilitate night vision, low light vision, and other viewing experiences.

Figure 1A:
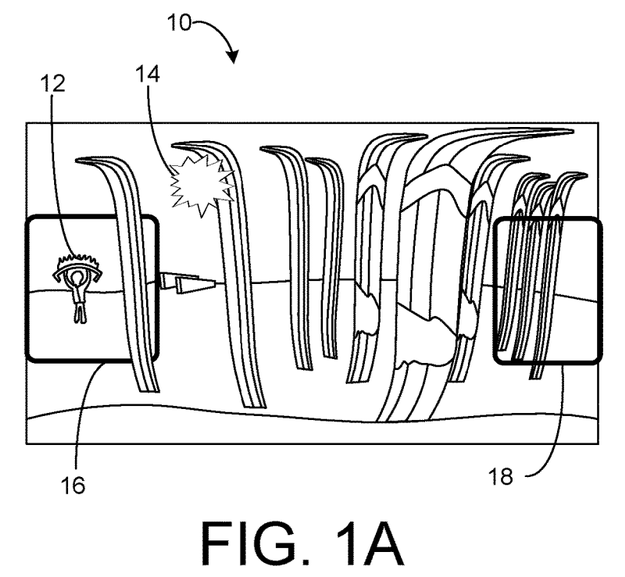
FIGS. 1A, 1B, and 1C illustrate applying adaptive exposure to a first example of a digital HDR image, according to a possible implementation of the present disclosure.

FIG. 1A shows a first example of a digital HDR image 10 projected onto an LDR display, according to a possible implementation of the present disclosure. The digital HDR image 10 includes a human figure that becomes a fixation point 12 when viewed by an observer of the digital HDR image 10. The digital HDR image 10 is backlit by a light source 14, e.g., the sun, causing the head of the person in the HDR image 10 to be obscured by a shadow, or underexposed. Meanwhile, the brightness of the sun creates an overexposed area of the digital HDR image 10. An eye-tracking region 16 includes the fixation point 12, indicated by an eye icon. A target region 18 is properly exposed.

Figure 1B:
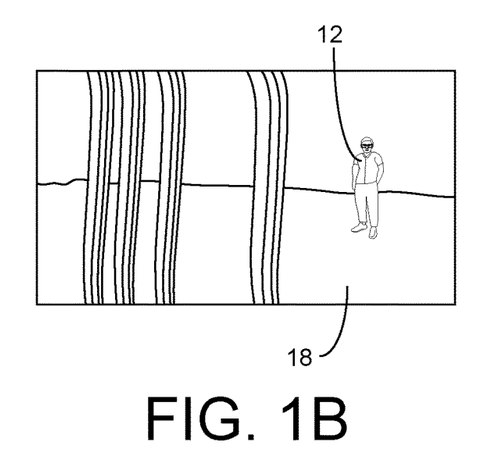

FIG. 1B shows a magnified view of the target region 18 of the digital HDR image 10, according to a possible implementation of the present disclosure. In FIG. 1B, the fixation point 12 has been projected onto the target region 18, which is properly exposed. A conversion of the 360 image from equirectangular to a gnomonic projection can be executed by a graphics processing unit (GPU). Then the exposure of the eye-tracking region 16 can be adaptively changed to the local exposure of the target region 18.

Figure 1C:
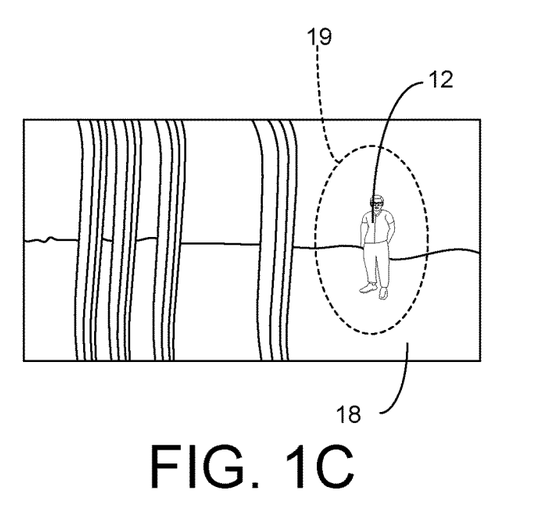

FIG. 1C shows a Gaussian mask 19 being applied to the fixation point 12 as projected into the target region 18, according to a possible implementation of the present disclosure. The Gaussian mask 19 can be used to smooth the image and blend the fixation point 12 into the target region 18.

Figure 2A:
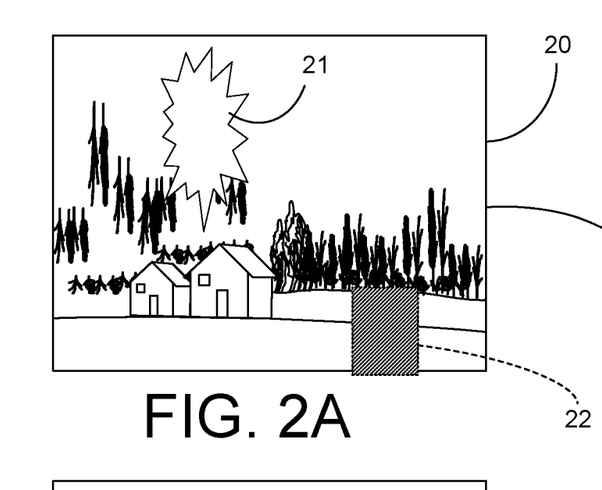
FIGS. 2A, 2B, 2C, and 2D illustrate applying adaptive exposure to a second example of a digital HDR image, according to a possible implementation of the present disclosure.

FIG. 2A shows a second example of a digital HDR image 20 projected onto an LDR display, according to a possible implementation of the present disclosure. The HDR image 20 is a 14-bit raw image of a night sky and a lakeside landscape displayed on an 8-bit LDR display with a default exposure. The night sky includes a bright region 21. Due to the bright region 21, the default exposure renders an area within a dashed line box 22, as an example area in the image 20, that is a black area lacking detail, that is, an underexposed area. The underexposure causes dark regions below the night sky, making details in this area invisible to the user.

Figure 2B:
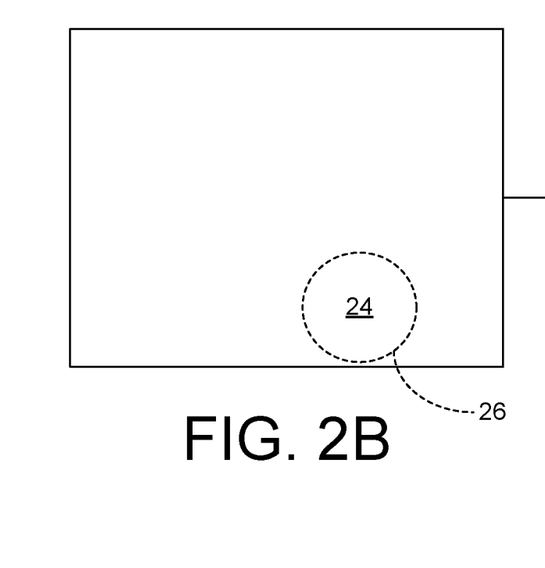
Figure 10:
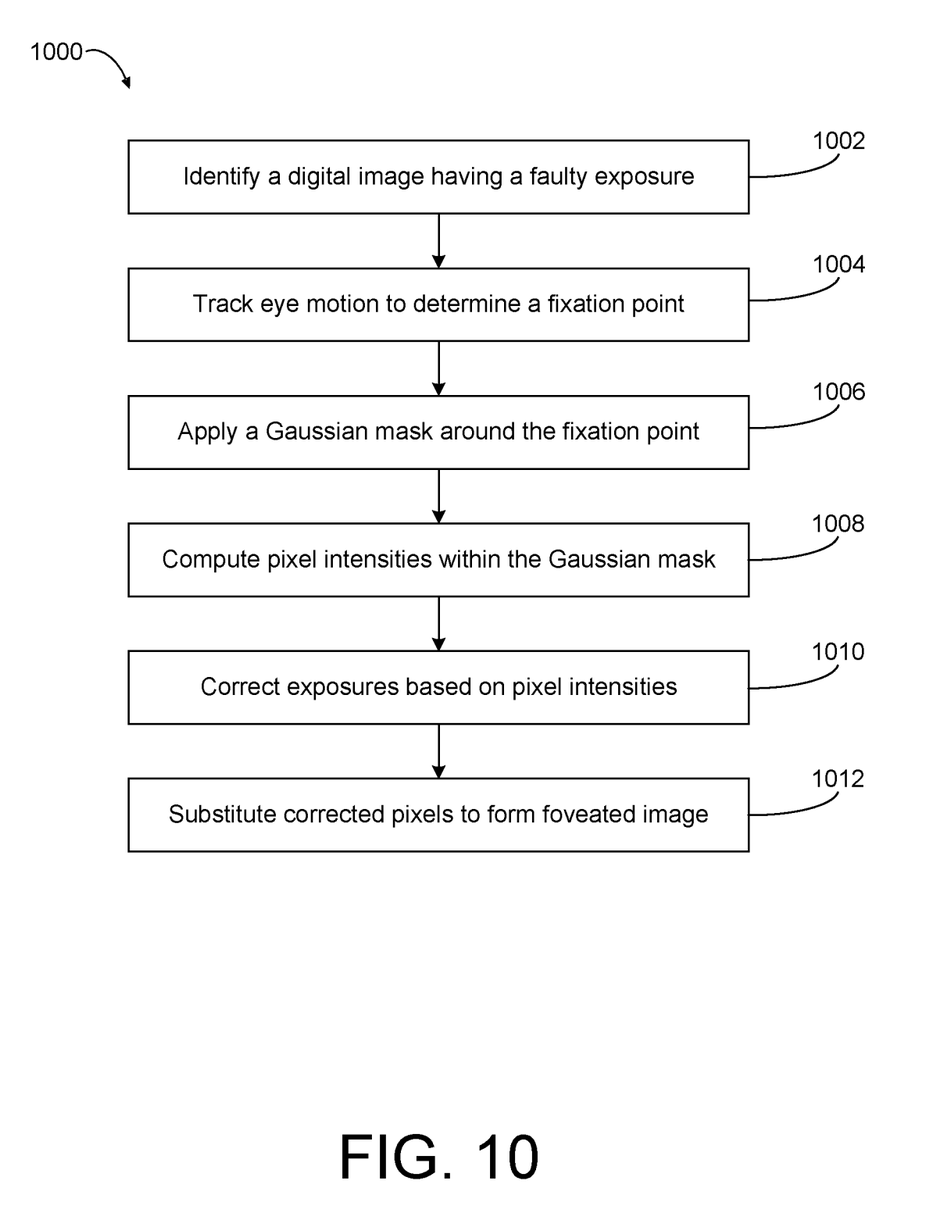
FIG. 10 is a flow chart for a method of creating foveated images with adaptive exposure according to a possible implementation of the present disclosure.

FIG. 2B shows a fixation point 24 that coincides with the dashed line box 22, according to a possible implementation of the present disclosure. The fixation point 24 has been identified by a gaze tracking device that follows an observer's eye gaze position. The fixation point 24 and the HDR image 20 can be supplied to the GPU. The GPU can then be configured to generate a Gaussian mask 26 around the fixation point 24. Using the Gaussian mask, the GPU applies a localized adaptive exposure to correct pixels of the HDR image 20 that are included within the dashed line box 22. This is described further with respect to operations 1008-1012 of a method 1000 (FIG. 10)

Figure 2C:
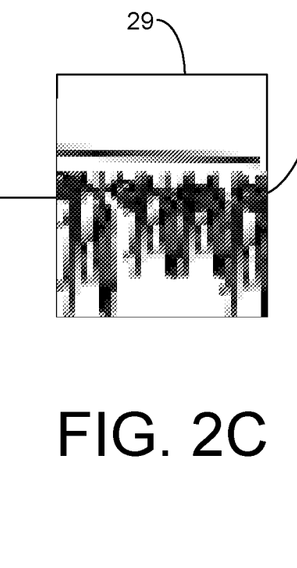

FIG. 2C shows a magnified image portion 29 having adapted exposure, e.g., as a result of the adaptive exposure process described by implementations of the present disclosure. The image portion 29 is formed by a set of corrected pixels that show a reflection of trees on the water, below the shoreline of the lake in the HDR image 20.

Figure 2D:
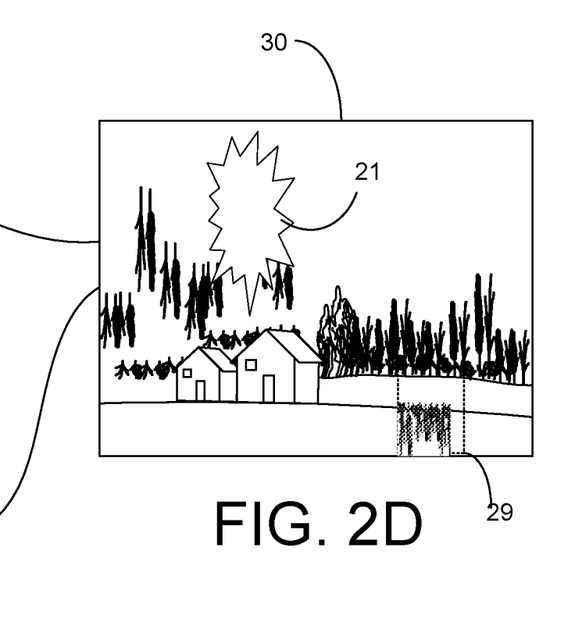

FIG. 2D shows a foveated HDR image with adaptive exposure 30, according to a possible implementation of the present disclosure. The foveated HDR image with adaptive exposure 30 can be formed by substituting the image portion 29 for the region inside the dashed line box 22. The foveated HDR image with adaptive exposure 30 can then be rendered on an LDR display with proper detail in the previously underexposed area. With the use of adaptive exposure, an observer can see through the darkness to reveal details of the trees and reflections.

FIGS. 3, 4, 5, 6A, 6B, 7A, and 7B show implementations of an LDR display in the form of VR/AR glasses. The VR/AR glasses include a world-facing camera capable of producing HDR images such as the HDR images 10 and 20. The VR/AR glasses also include a gaze tracking device for determining the fixation point 24.

Figure 3:
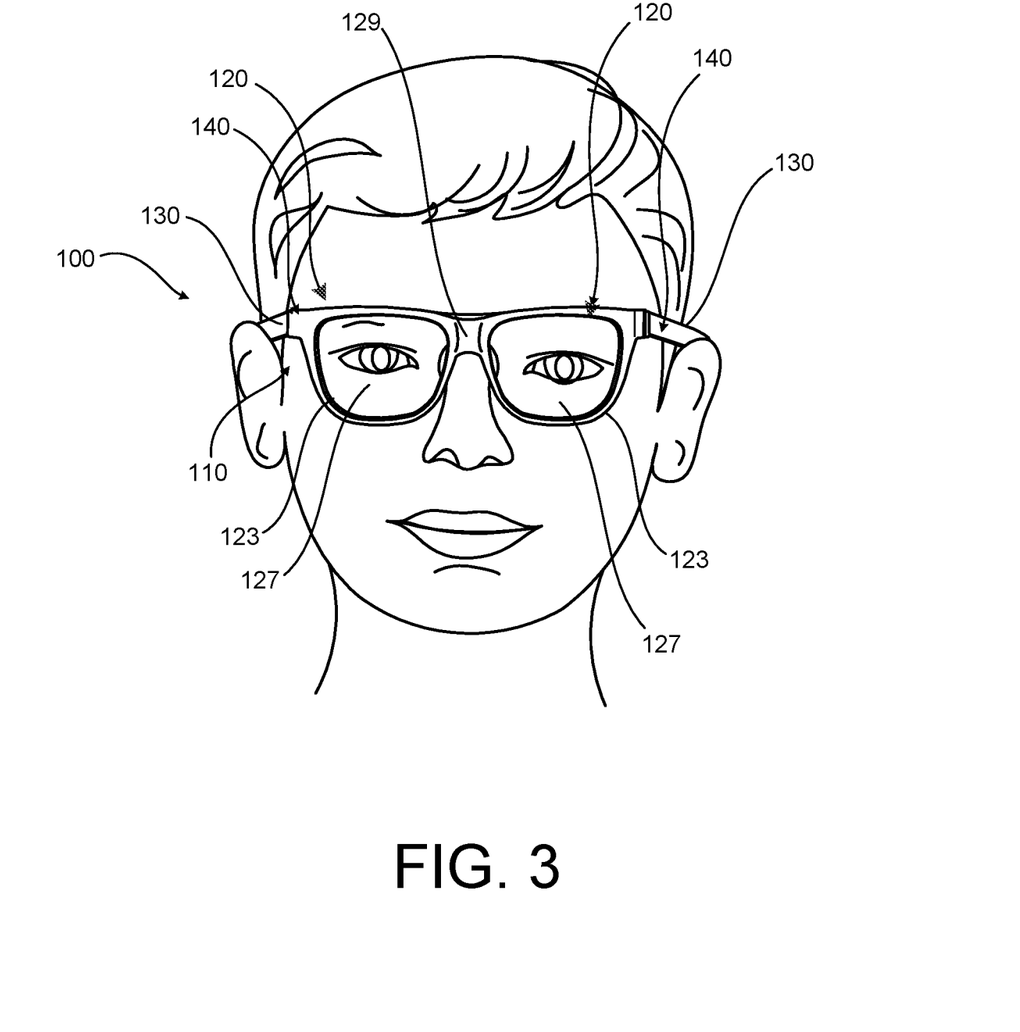
FIG. 3 is a pictorial view of a user wearing smart glasses, according to a possible implementation of the present disclosure.
Figure 4:
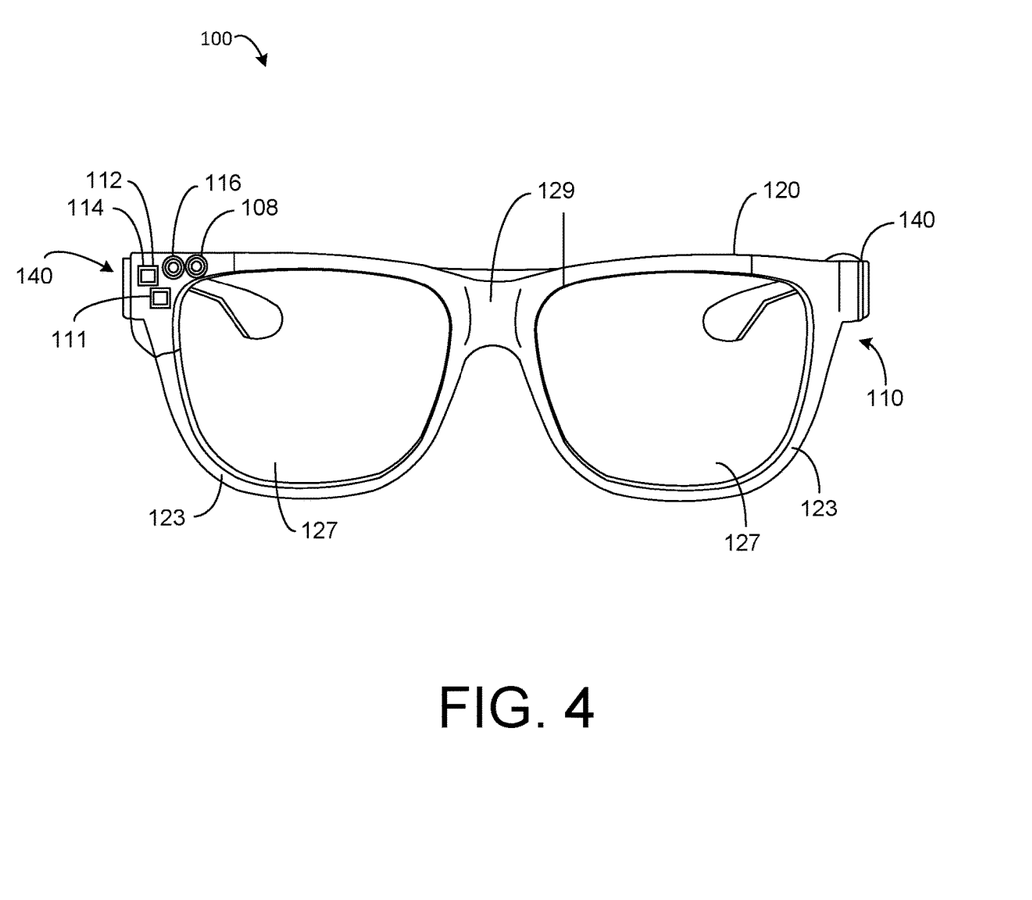
FIG. 4 is a front view of the smart glasses, according to a possible implementation of the present disclosure.
Figure 5:
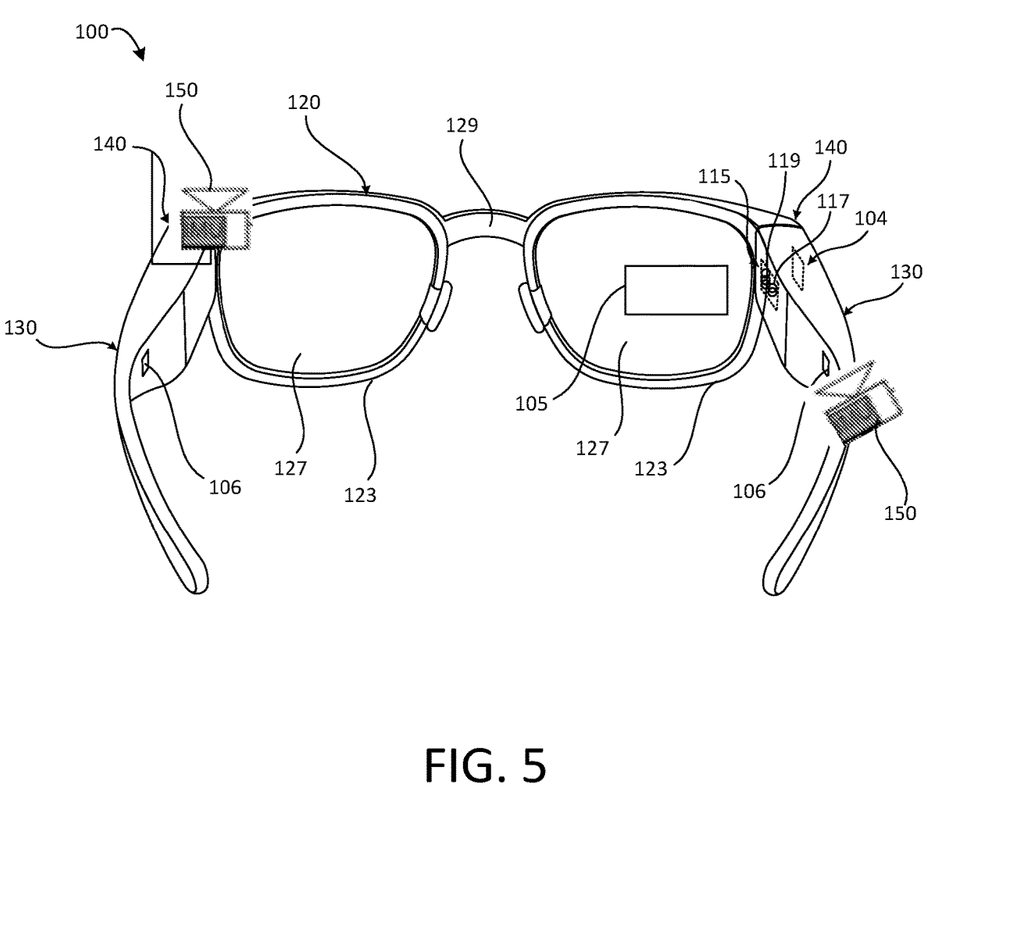
FIG. 5 is a rear view of the smart glasses, showing placement of an IMU according to a possible implementation of the present disclosure.

FIG. 3 illustrates a user with a wearable example of an LDR display, e.g., a head-mounted wearable display 100 in the form of smart glasses, or VR/AR glasses. In some implementations, the head-mounted wearable display 100 can be in the form of VR/AR goggles or another alternative style headset. The head-mounted wearable display 100 includes display capability, eye/gaze tracking capability, and computing/processing capability. FIG. 4 is a front view, and FIG. 5 is a rear view, of the example head-mounted wearable display 100 shown in FIG. 3. The example head-mounted wearable display 100 includes a frame 110. The frame 110 includes a front frame portion 120, and a pair of temple arm portions 130 rotatably coupled to the front frame portion 120 by respective hinge portions 140. The front frame portion 120 includes rim portions 123 surrounding respective optical portions in the form of lenses 127, with a bridge portion 129 connecting the rim portions 123. The temple arm portions 130 are coupled, for example, pivotably or rotatably coupled, to the front frame portion 120 at peripheral portions of the respective rim portions 123. In some examples, the lenses 127 are corrective/prescription lenses. In some examples, the lenses 127 are an optical material including glass and/or plastic portions that do not necessarily incorporate corrective/prescription parameters.

In some examples, the head-mounted wearable display 100 includes a display device 104 that can output visual content, for example, at an output coupler 105, so that the visual content is visible to the user. In the example shown in FIGS. 4 and 5, the display device 104 is provided in one of the two arm portions 130, simply for purposes of discussion and illustration. Display devices 104 may be provided in each of the two arm portions 130 to provide for binocular output of content. In some examples, the display device 104 may be a see-through near eye display. In some examples, the display device 104 may be configured to project light from a display source onto a portion of teleprompter glass functioning as a beam splitter seated at an angle (e.g., 30-45 degrees). The beam splitter may allow for reflection and transmission values that allow the light from the display source to be partially reflected while the remaining light is transmitted through. Such an optic design may allow a user to see both physical items in the world, for example, through the lenses 127, next to content (for example, digital images, user interface elements, virtual content, and the like) output by the display device 104. In some implementations, waveguide optics may be used to depict content on the display device 104. In some implementations, the display device 104 can include an organic light emitting diode (OLED) display configured to reproduce an image.

In some examples, the head-mounted wearable display 100 includes one or more of an audio output device 106 (such as, for example, one or more speakers), an illumination device 108, a sensing system 111, a control system 112, at least one processor 114, a gaze tracking device 115, and a head-mounted outward facing image sensor e.g., a camera 116. In some implementations, the camera 116 is referred to as a world-facing camera, or an egocentric camera, as opposed to an inward facing image sensor/camera such as the gaze tracking device 115. One or more of the gaze tracking device 115 and the camera 116 can be powered by a battery housed in the frame of the head-mounted wearable display 100. The battery can be, for example, a lithium-ion rechargeable battery. In some examples, the sensing system 111 may include various sensing devices and the control system 112 may include various control system devices including, for example, one or more graphics processing units (GPUs) 114 operably coupled to the components of the control system 112. In some examples, the control system 112 may include a communication module, e.g., an RF headset transceiver, providing for communication and exchange of information between the head-mounted wearable display 100 and other external devices. In some implementations, the transceiver includes a receiver and a transmitter configured to operate in different bands, or frequency ranges, depending on the type or location of the external devices. For example, the headset may communicate with the hand gesture sensing device 202 using short-range signals, e.g., Bluetooth™ and with the server computing system 1150 using longer-range RF signals such as WiFi or 4G/5G.

The gaze tracking device 115 is configured to detect and track eye gaze direction and movement. Data captured by the gaze tracking device 115 may be processed to detect and track gaze direction and movement as a user input. In the example shown in FIGS. 4 and 5, the gaze tracking device 115 is provided in one of the two arm portions 130, simply for purposes of discussion and illustration. In the example arrangement shown in FIGS. 4 and 5, the gaze tracking device 115 is provided in the same arm portion 130 as the display device 104, so that user eye gaze can be tracked not only with respect to objects in the physical environment, but also with respect to the content output for display by the display device 104. In some examples, gaze tracking devices 115 may be provided in each of the two arm portions 130 to provide for gaze tracking of each of the two eyes of the user. In some examples, display devices 104 may be provided in each of the two arm portions 130 to provide for binocular display of visual content.

Figure 6A:
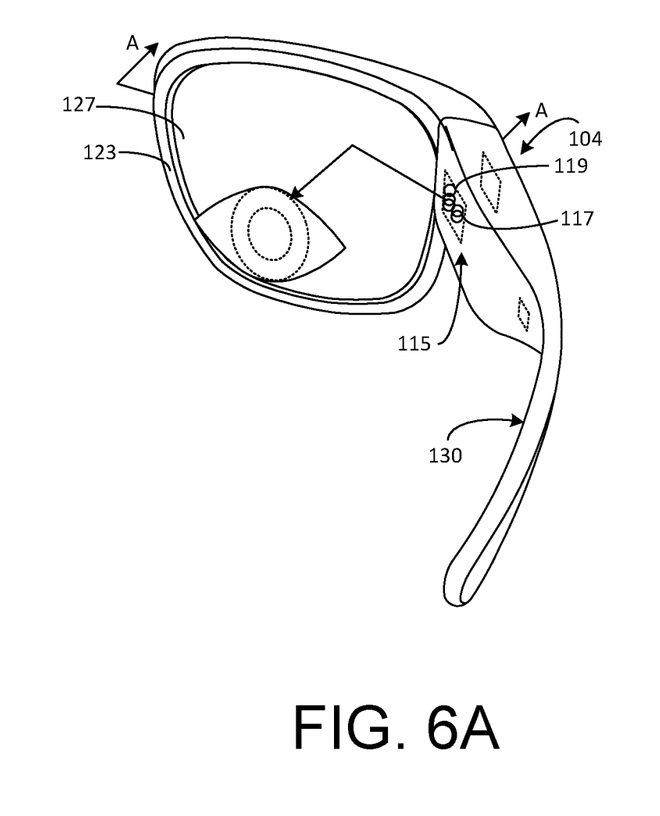
FIGS. 6A, 6B, 7A, and 7B illustrate operation of a gaze tracking device, according to a possible implementation of the present disclosure.
Figure 6B:
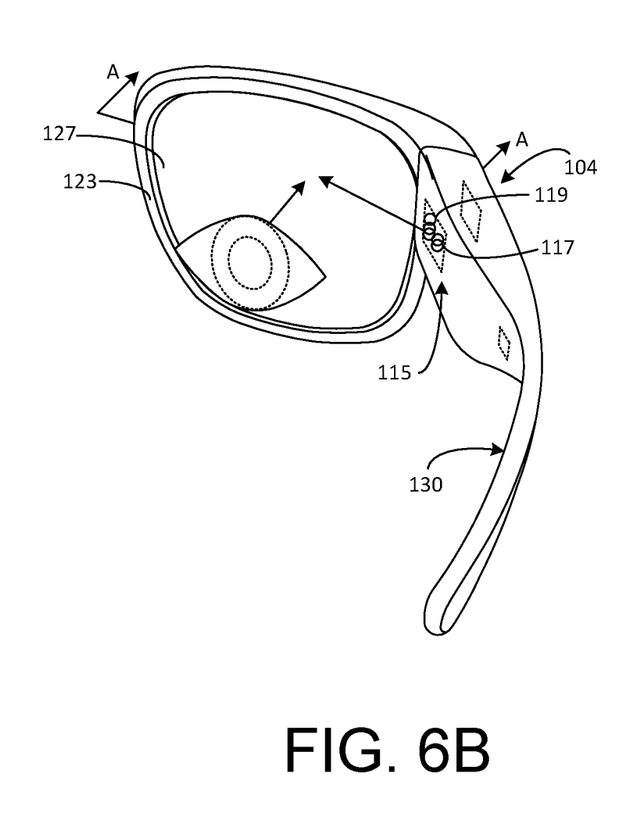
Figure 7A:
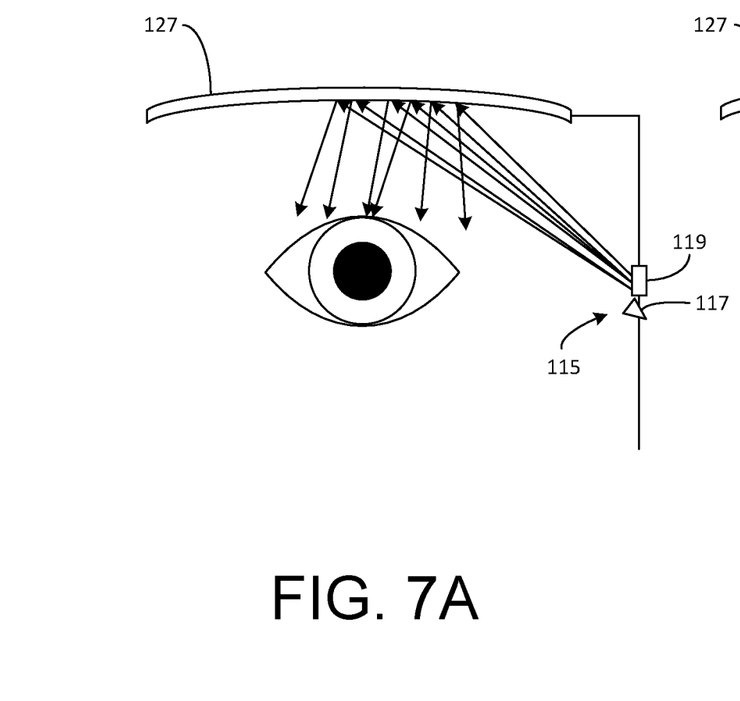
Figure 7B:
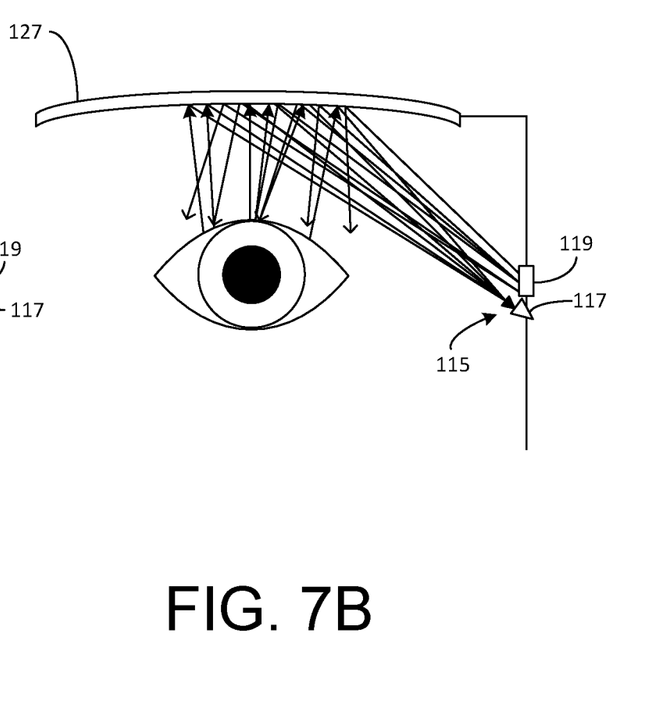

FIGS. 6A, 6B, 7A, and 7B illustrate operation of the example gaze tracking device 115. FIGS. 6A and 6B are partial perspective views of the example gaze tracking device 115 provided in one of the two temple arm portions 130 of the head-mounted wearable display 100, simply for ease of discussion and illustration. As noted above, a gaze tracking device 115 may be provided in each of the two temple arm portions 130. FIGS. 7A and 7B are schematic illustrations, respectively corresponding to FIGS. 6A and 6B, of the operation of the gaze tracking device 115.

In this example, the gaze tracking device 115 includes an image sensor 117 (for example, a camera) and a light source 119. In some examples, the lens 127 may include a reflective portion. The image sensor 117 may capture an image of the eye of the user based on a reflection of the eye of the user at the reflective portion of the lens 127. In some examples, the reflective portion of the lens 127 may be defined by a reflective coating applied to the lens 127. In some examples, the reflective coating may be made of a material that provides reflective properties but does not obstruct the user's view through the lens 127. For example, the reflective coating may be a near infrared coating material. In some examples, the capture of the reflected image of the eye of the user may be facilitated by illuminating the eye of the user. As shown in FIGS. 6A and 7A, the light source 119 may emit light toward the lens 127 of the head-mounted wearable display 100. The light emitted by the light source 119 may be reflected by the lens 127, for example, the reflective portion of the lens 127, toward the eye of the user to illuminate the eye of the user. As shown in FIGS. 6B and 7B, the image sensor 117 may capture an image of the illuminated eye of the user reflected at the lens 127, for example, at the reflective portion of the lens 127. The light source 119 may emit light that is not visible to the user, so that the light emitted by the light source 119 is not a distraction, a source of discomfort, and the like while the head-mounted wearable display 100 is worn. For example, the light source 119 may emit infrared light, so that the light is not visible to the user.

Figure 8:
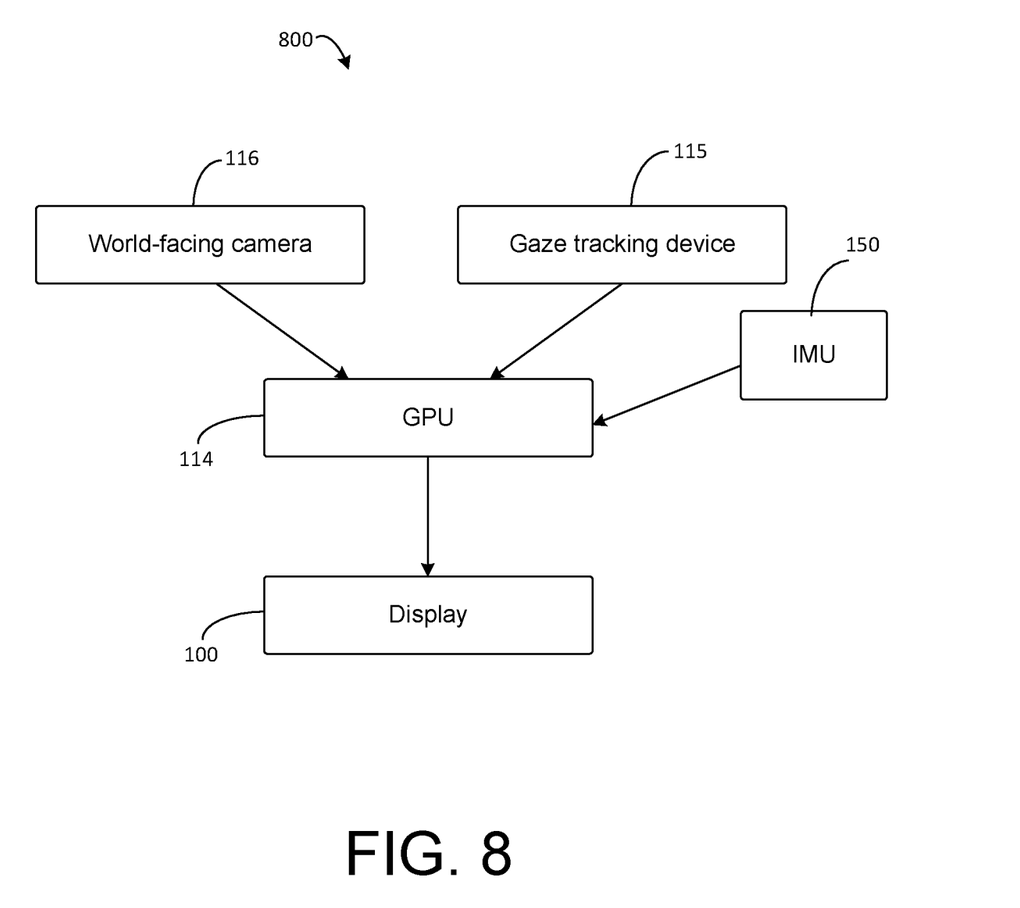
FIG. 8 is a block diagram of a system for creating foveated images with adaptive exposure, according to a possible implementation of the present disclosure.

FIG. 8 is a block diagram of a system 800 for foveated imaging with adaptive exposure, according to a possible implementation of the present disclosure. Elements of the system 800 include data-producing components, e.g., components of a VR/AR system such as those shown in FIGS. 3, 4, 5, 6A, 6B, 7A, and 7B. In some implementations, the system 800 includes the world-facing camera 116, the gaze tracking device 115, the inertial measurement unit (IMU) 150, a graphics processing unit (GPU) 114, and the display 100. The world-facing camera 116, the gaze tracking device 115, and the IMU 150 are communicatively coupled to the GPU 114 to provide input data thereto for processing. The IMU 150 provides information about the position of the head-mounted display (HMD). The GPU 114 is coupled to the display 100 to provide processed image data thereto, for rendering.

In some implementations, components of the system 800 are not part of a VR/AR system. Instead, the system 800 can include discrete components and the GPU can be provided as a processor 1132 within the computing system 1100 as described below. In some implementations, one or more of the components of system 800 may be located remotely from one another.

Figure 9:
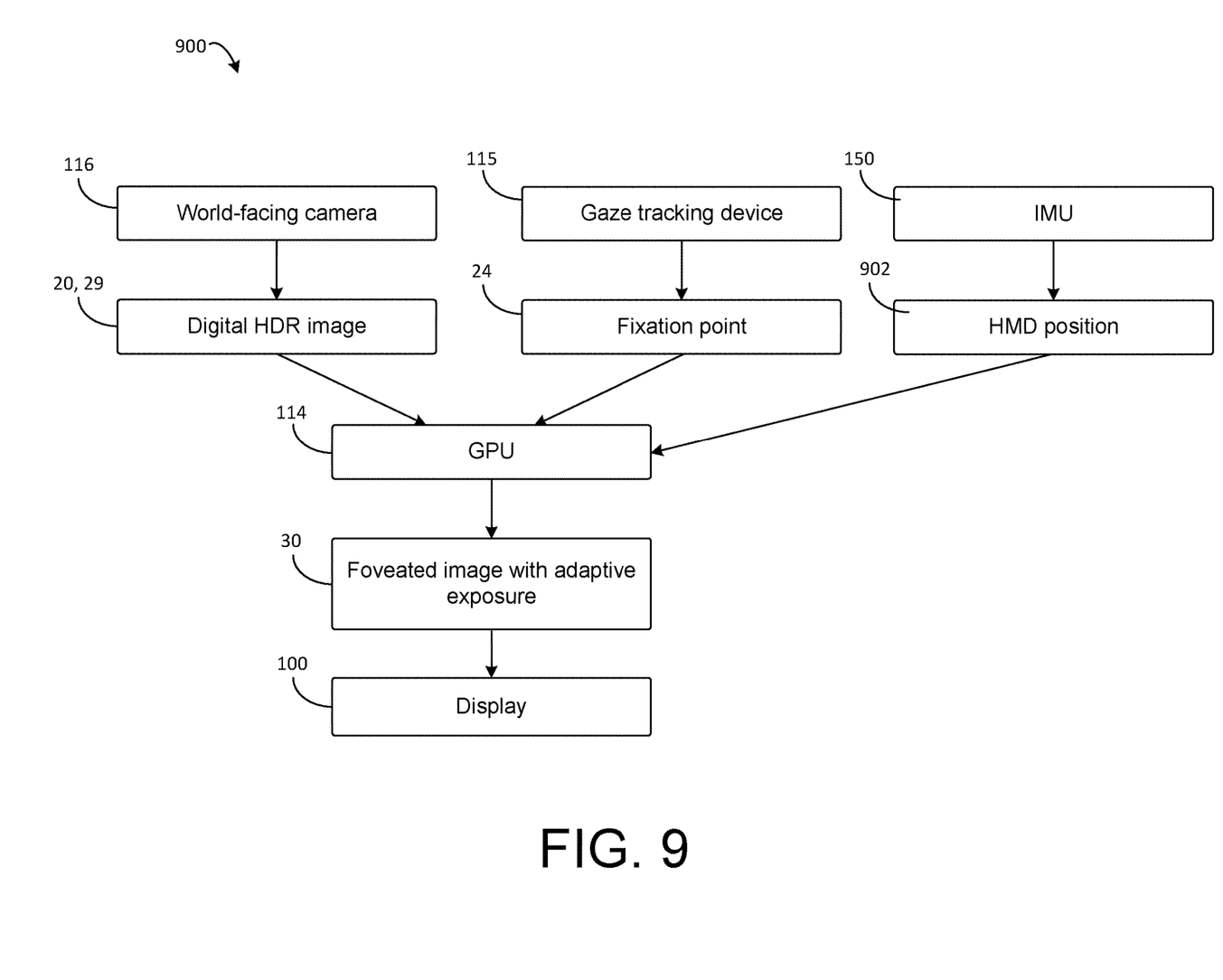
FIG. 9 is a data flow diagram corresponding to the system shown in FIG. 8, according to a possible implementation of the present disclosure.

FIG. 9 is a diagram showing data flow 900 within the system 800 for foveated imaging with adaptive exposure, according to a possible implementation of the present disclosure. The data flow 900 concerns data elements shown in FIGS. 1A, 1B, 1C, 2A, 2B, 2C, and 2D that are shared among the components of the system 800. The data elements include digital images, e.g., the digital HDR image 20 that exhibits over-exposed and/or under-exposed regions; the fixation point 24; an image portion, e.g., the image portion 29 that includes corrected pixels; an HMD position 902 provided by the IMU, and a foveated image, e.g., the foveated image with adaptive exposure 30. The digital HDR images 10 and 20 and the fixation point(s) 24 are transmitted as data inputs to the GPU 114. The GPU 114 performs various image processing operations as described below with reference to the method 1000, to generate the foveated image with adaptive exposure 30. That is, the GPU 114 increases the exposure in some areas of the digital image 20 so as to lighten the shadows and decreases the exposure in other areas of the digital image 20 so as to darken the brightness to generate the foveated image with adaptive exposure 30. The foveated image with adaptive exposure 30 can then be rendered for viewing on the display device 104 associated with the head-mounted wearable display 100.

FIG. 10 illustrates a method 1000 of foveated imaging with adaptive exposure, according to a possible implementation of the present disclosure. Operations of the method 1000 can be performed in a different order, or not performed, depending on specific applications. The method 1000 may be performed using the apparatus shown in FIGS. 3, 4, 5, 6A, 6B, 7A, 7B, 8, and 9. The method 1000 includes preliminary operations that can occur during or after a VR/AR experience. It is noted that the method 1000 may provide a spatially adaptive exposure for part, but not all, of an input image. Accordingly, it is understood that additional processes can be provided before, during, or after the method 1000, and that some of these additional processes may be briefly described herein.

The method 1000 includes, at 1002, identifying a digital image having a faulty exposure, according to a possible implementation of the present disclosure. Identification of the image can be automated by evaluating pixel intensity values and determining whether or not the image, when displayed on a LTR display, contains blocks of extreme pixel intensity values such as black regions or white regions that do not include a full range of greyscale tones. Alternatively, identification of the image can include assessing the user's gaze to infer areas of interest as described below. Other ways to identify a suitable image include detecting faces that may be in shadow, detecting illegible text or signage, or detecting other content that can be recognized by sensors as being improperly exposed. In some implementations, images to be evaluated can be still digital images or frames of a digital video. In some implementations, images to be evaluated can be real-time streaming video images; 3D synthesized scenes including meshes, avatars, or virtual objects; or 3D animations that are part of a VR/AR experience.

The method 1000 further includes, at 1004, tracking eye motion of a user to determine a fixation point, according to a possible implementation of the present disclosure. Tracking the eye motion is accomplished using the gaze tracking device 115 as described above with respect to FIGS. 3, 4, 5, 6A, 6B, 7A, and 7B. When the gaze tracking device 115 detects a substantially stationary gaze vector, that is, the user's eye motion is observed to be fixed on a particular area of interest within the input image, e.g., the dashed line box 22 in the digital HDR input image 20, the fixation point 24 is identified. A substantially stationary gaze can be determined relative to statistical eye motion.

The method 1000 further includes, at 1006, configuring the GPU to apply the Gaussian mask 26 around the fixation point 24, according to a possible implementation of the present disclosure. The Gaussian mask 26 helps to determine how much of the image around the fixation point should be processed. A Gaussian distribution has a central peak and decreases exponentially in all directions away from the peak, with a width that depends on the standard deviation of points in the distribution. In the present context, the Gaussian mask 26 superimposes a Gaussian distribution onto pixels in the vicinity of the fixation point 24, thereby selecting pixels within a radius of the fixation point that depends on the statistics of the pixel intensity values. In some implementations, the Gaussian mask encompasses less than about 10% of the area of the digital HDR input image 20.

The method 1000 further includes, at 1008, computing average pixel intensities for each of the pixels within the Gaussian mask 26 according to a possible implementation of the present disclosure. Pixel intensity can be computed by weighting the red, green, and blue (RGB) components of the pixel color according to the standard formula: Pixel Intensity=0.299*Red+0.587*Green+0.114*blue. The average pixel intensity can be computed using a prefix sum to average square blocks of pixels, e.g., 1×1, 2×2, 4×4, 8×8, and so on.

The method 1000 further includes, at 1010, correcting exposures based on the computed pixel intensities, for pixels within the Gaussian mask 26, according to a possible implementation of the present disclosure. Where the computed pixel intensities are too bright, i.e., exceeding a light threshold level (e.g., an upper threshold level), the pixel can be corrected by decreasing the exposure below the light threshold value. The light threshold level may have a value within about 10% of the top of the intensity range. Where the computed pixel intensities are too dark, i.e., below a dark threshold value (e.g., a lower threshold level), the pixel can be corrected by increasing the exposure to a level above the dark threshold value. The dark threshold level may have a value within about 10% of the bottom of the intensity range. In some implementations, a relative exposure can be determined as the average pixel intensity/reference intensity, e.g., a maximum pixel intensity such as 256. The degree to which pixel exposures are increased or decreased can be determined according to the pixel location relative to the Gaussian mask 26. For example, pixels located near the outer edge of the Gaussian mask 26 may need less adjustment than pixels located near the center of the Gaussian mask 26.

In some implementations, instead of correcting an exposure, the GPU may adjust a contrast value to achieve a similar effect, e.g., when displaying text.

The method 1000 further includes, at 1012, substituting the corrected pixels from operation 1010 in the input image 20 to form a foveated image with adaptive exposure 30, according to a possible implementation of the present disclosure.

The method 1000 can be employed in systems other than a head-mounted VR/AR system. For example, the system 800, can include, for example, video systems such as TVbased systems, teleconferencing systems, computer-based video systems, automotive-based video systems, electronic book (e-book) reading devices, GPS-based mapping programs that rely on immersive street-view images, mobile robot vision systems, camera arrays used for precision motion capture, and interactive touch displays that incorporate cameras.

Figure 11:
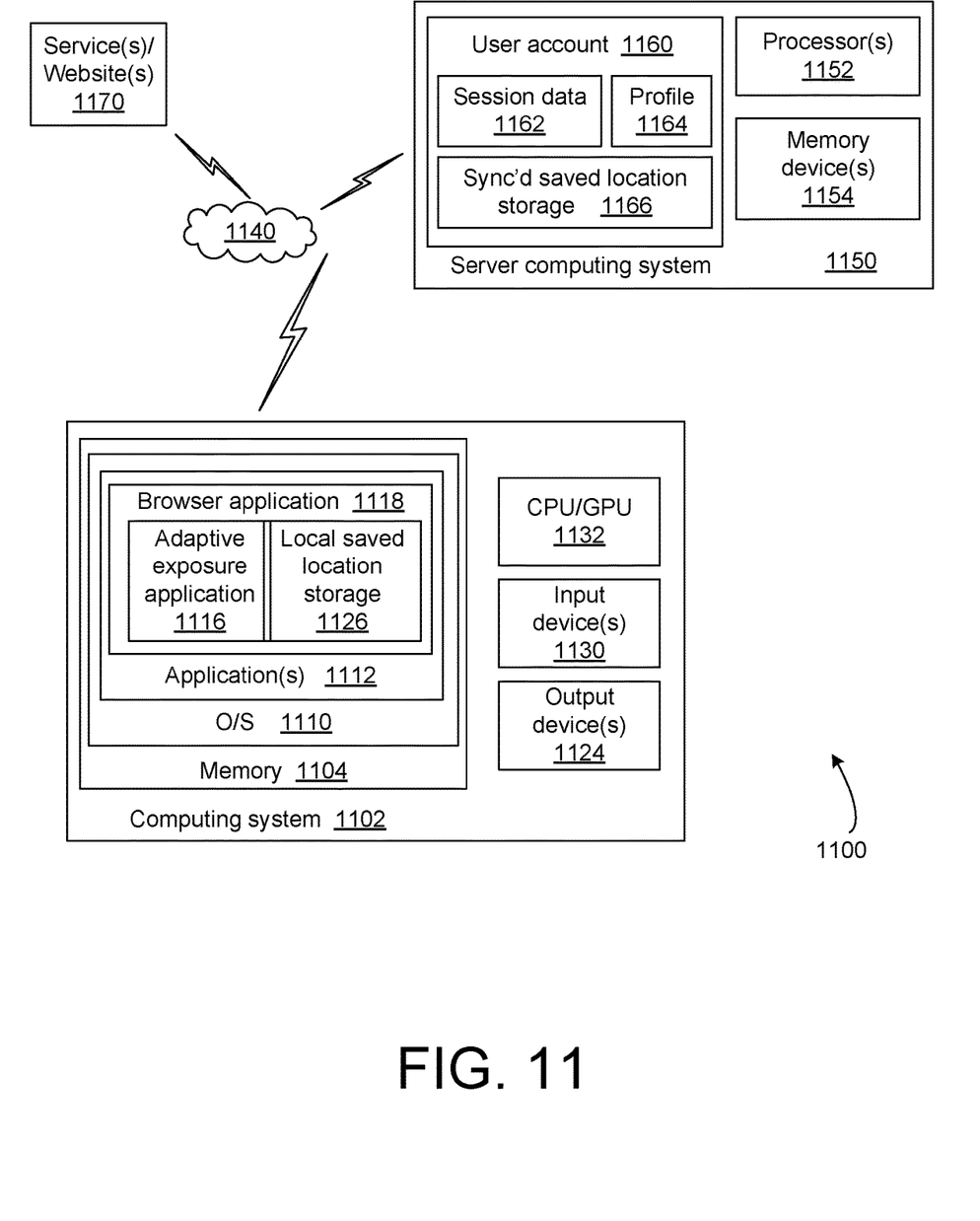
FIG. 11 is a block diagram of an Internet server system, according to a possible implementation of the present disclosure.

FIG. 11 illustrates a computer system 1100 that includes a server computing system 1150 to perform functions that involve a network, e.g., the Internet, in accordance with some implementations of the present disclosure. The system 1100 includes a computing system 1102. The computing system 1102 may be referred to as a client computing device or a client device. The computing system 1102 is a device that has an operating system 1110. In some examples, the computing system 1102 includes a personal computer, a mobile phone, a tablet, a netbook, a laptop, a smart appliance (e.g., a smart television), or a wearable computing device. The computing system 1102 can be any computing device with input devices(s) 1130, such as a mouse, trackpad, touchscreen, keyboard, virtual keyboard, camera, etc. The computing system 1102 can include output device(s) 1124, such as a display (monitor, touchscreen, etc.) that enables a user to view and select displayed content. The computing system 1102 may include one or more processors, such as CPU/GPU 1132, formed in a substrate configured to execute one or more machine executable instructions or pieces of software, firmware, or a combination thereof. The processors, such as CPU/GPU 1132, can be semiconductor-based—that is, the processors can include semiconductor material that can perform digital logic. The computing system 1102 may include one or more memory devices 1104. The memory devices 1104 may include a main memory that stores information in a format that can be read and/or executed by the CPU/GPU 1132. The memory devices 1104 may store applications or modules (e.g., operating system 1110, applications 1112, an adaptive exposure application 1116, browser application 1118, etc.) that, when executed by the CPU/GPU 1132, perform certain operations. For example, the adaptive exposure application 1116 may be executed by the CPU/GPU 1132 to perform operations of the method 1000.

The operating system 1110 is a system software that manages computer hardware, software resources, and provides common services for computing programs. In some examples, the operating system 1110 is operable to run on a personal computer such as a laptop, netbook, or a desktop computer. In some examples, the operating system 1110 is operable to run a mobile computer such as a smartphone or tablet. The operating system 1110 may include a plurality of modules configured to provide the common services and manage the resources of the computing system 1102. The computing system 1102 may include one or more input devices 1130 that enable a user to select content. Non-exclusive example input devices 1130 include a keyboard, a mouse, a touch-sensitive display, a trackpad, a trackball, and the like. The computing system 1102 may include one or more output devices 1124 that enable a user to view a webpage and/or receive audio or other visual output.

The computing system 1102 may include applications 1112, which represent specially programmed software configured to perform different functions. One of the applications may be the browser application 1118. The browser application 1118 may be configured to display webpages, execute web applications, and the like. The browser application 1118 may include additional functionality in the form of extensions. In some implementations, the browser application 1118 may also be the operating system 1110 of the computing system 1102, e.g., similar to the CHROME OS. The browser application 1118 may include local saved location storage 1126. The local saved location storage 1126 may be a data store where saved locations (bookmarks, favorites, internet shortcuts, etc.) are stored.

In some implementations, the local saved location storage 1126 may be associated with a user profile. In other words, more than one user may have access to the computing system 1102 and may use the browser application 1118. In such scenarios, the local saved location storage 1126 may be associated with a user profile, so that each user of the browser application 1118 may have a separate respective local saved location storage 1126. In some implementations, the user may opt for saved location synchronization. Saved location synchronization may be initiated by the user on the computing system 1102. After initiating saved location synchronization on the computing system 1102, the local saved location storage 1126 may be shared with a user account 1160 for the user on server computing system 1150.

In some examples, the computing system 1102 may communicate with a server computing system 1150 over a network 1140. The server computing system 1150 may be a computing device or computing devices that take the form of a number of different devices, for example a standard server, a group of such servers, or a rack server system. In some examples, the server computing system 1150 may be a single system sharing components such as processors and memories. The network 1140 may include the Internet and/or other types of data networks, such as a local area network (LAN), a wide area network (WAN), a cellular network, satellite network, or other types of data networks. The network 1140 may also include any number of computing devices (e.g., computer, servers, routers, network switches, etc.) that are configured to receive and/or transmit data within network 1140. Network 1140 may further include any number of hardwired and/or wireless connections.

The server computing system 1150 may include one or more processors 1152 formed in a substrate, an operating system (not shown) and one or more memory devices 1154. The memory devices 1154 may represent any kind of (or multiple kinds of) memory (e.g., RAM, flash, cache, disk, tape, etc.). In some examples (not shown), the memory devices 1154 may include external storage, e.g., memory physically remote from but accessible by the server computing system 1150. The server computing system 1150 may include one or more modules or engines representing specially programmed software. For example, the server computing system 1150 may include systems for managing and accessing user account(s) 1160. The user accounts 1160 may include data that a user has requested to be synchronized across devices, such as computing system 1102. The synchronized data can include session data 1162. The session data 1162 can enable a user to resume browsing activity after switching devices. The user account 1160 may also include profile data 1164. The profile data 1164 may include, with user consent, information describing the user. The profile data 1164 may also include data that identifies a user (e.g., a username and password). The user account 1160 may also include synchronized saved location storage 1166. The saved location storage 1166 may be a data store of saved locations for the user across devices. For example, as part of a synchronization activity the local saved location storage 1126 may be sent from the computing system 1102 to the server computing system 1150 and saved in saved location storage 1166.

The terminology used herein is for the purpose of describing particular implementations only and is not intended to be limiting of the disclosed implementations. As used herein, the singular forms "a," "an," and "the" are intended to include the plural forms as well, unless the context clearly indicates otherwise. It will be further understood that the terms "comprises," "comprising." "includes," and/or "including." when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled." "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for case of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below", or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example implementations of the concepts are described herein with reference to cross-sectional illustrations that are schematic illustrations of idealized implementations (and intermediate structures) of example implementations. As such, variations from the shapes of the illustrations as a result, for example, of manufacturing techniques and/or tolerances, are to be expected. Thus, example implementations of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example implementations.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the disclosed implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

The invention claimed is:

1. A method, comprising:
   identifying image data having an underexposed area or an overexposed area;
   determining a fixation point in the image data based on eye motion of an observer;
   superimposing a probability distribution onto a plurality of pixels within a radius of the fixation point by setting a mean of the probability distribution to the fixation point;
   for the pixels in the plurality of pixels within the radius:
      computing pixel intensities for the plurality of pixels within the radius of the fixation point, and
      adjusting an exposure setting of the pixels as a function of a location of the pixels relative to the fixation point, the pixel intensities, the probability distribution, and a dark threshold value or a light threshold value; and
   causing display of the image data to a user.

2. The method of claim 1, wherein the dark threshold value is within about 10% of a top intensity.

3. The method of claim 1, wherein the light threshold value is within about 10% of a bottom intensity.

4. The method of claim 1, wherein the plurality of pixels within the radius of the fixation point encompasses less than 10% of the image data.

5. The method of claim 1, wherein the image data is derived from a synthetic 3D scene.

6. The method of claim 1, wherein the probability distribution is a Gaussian distribution.

7. The method of claim 1, wherein the radius is defined according to the probability distribution.

8. A system, comprising:
   a display;
   a world-facing camera attached to the display, the world-facing camera configured to produce a image data;
   a gaze tracking device attached to the display, the gaze tracking device configured to superimpose a probability distribution onto a plurality of pixels within a radius of a fixation point by setting a mean of the probability distribution to the fixation point; and
   a graphics processing unit (GPU), communicatively coupled to the world-facing camera, the gaze tracking device, and the display, the GPU configured to adaptively correct exposures of the plurality of pixels to produce a foveated image for projection onto the display by computing a pixel intensity a pixel of the plurality of pixels and adjusting an exposure setting of the pixel as a function of a location of the pixel relative to the fixation point, the pixel intensity, the probability distribution, and a dark threshold value or a light threshold value.

9. The system of claim 8, wherein the display is a low dynamic range display.

10. The system of claim 8, wherein the display is a head-mounted display suitable for augmented reality and virtual reality use.

11. The system of claim 8, wherein the image data is a high dynamic range image.

12. The system of claim 8, wherein the image data has at least 10-bit resolution and the display has 8-bit resolution.

13. The system of claim 8, wherein the gaze tracking device is an infrared gaze tracking device configured to track a user's eye gaze at a frequency of 120 Hz.

14. The system of claim 8, wherein the foveated image is an image of a user's field of view.

15. A headset, comprising:
a wearable display;
a world-facing camera attached to the wearable display;
a gaze tracking device attached to the wearable display; and
a graphics processing unit (GPU) coupled to the world-facing camera, the gaze tracking device, and the wearable display, the GPU configured to:
receive image data and an area of interest defined according to a fixation point and a probability distribution superimposed onto a plurality of pixels of the image data within a radius of the fixation point by setting a mean of the probability distribution to the fixation point;
adjust an exposure of a portion of the image data corresponding to the area of interest, to produce a foveated image by computing a pixel intensity a pixel of the plurality of pixels and adjusting an exposure setting of the pixel as a function of a location of the pixel relative to the fixation point, the pixel intensity, the probability distribution, and a dark threshold value or a light threshold value; and
project the foveated image onto the wearable display.

16. The headset of claim 15, wherein the world-facing camera is configured to capture the image data as 360-degree image data and transmit the image data to the GPU.

17. The headset of claim 15, wherein the world-facing camera is configured to capture the image data as image data of a scene and transmit the image data to the GPU.

18. The headset of claim 17, wherein the gaze tracking device is configured to identify the area of interest in the scene, the area of interest indicating a faulty exposure in the image of the scene and transmit the area of interest to the GPU.

19. The headset of claim 18, wherein the area of interest is identified by a substantially stationary gaze vector detected by the gaze tracking device.

20. The headset of claim 18, wherein the GPU is configured to adjust a contrast value of a portion of the display identified by the gaze tracking device.

21. The headset of claim 15, further comprising an inertial measurement unit (IMU) configured to measure a position of the wearable display and transmit the position to the GPU.

* * * * *